No. 674,473. Patented May 21, 1901.
J. F. SANDERSON.
ELEVATOR.
(Application filed June 9, 1900.)
(No Model.) 5 Sheets—Sheet 1.
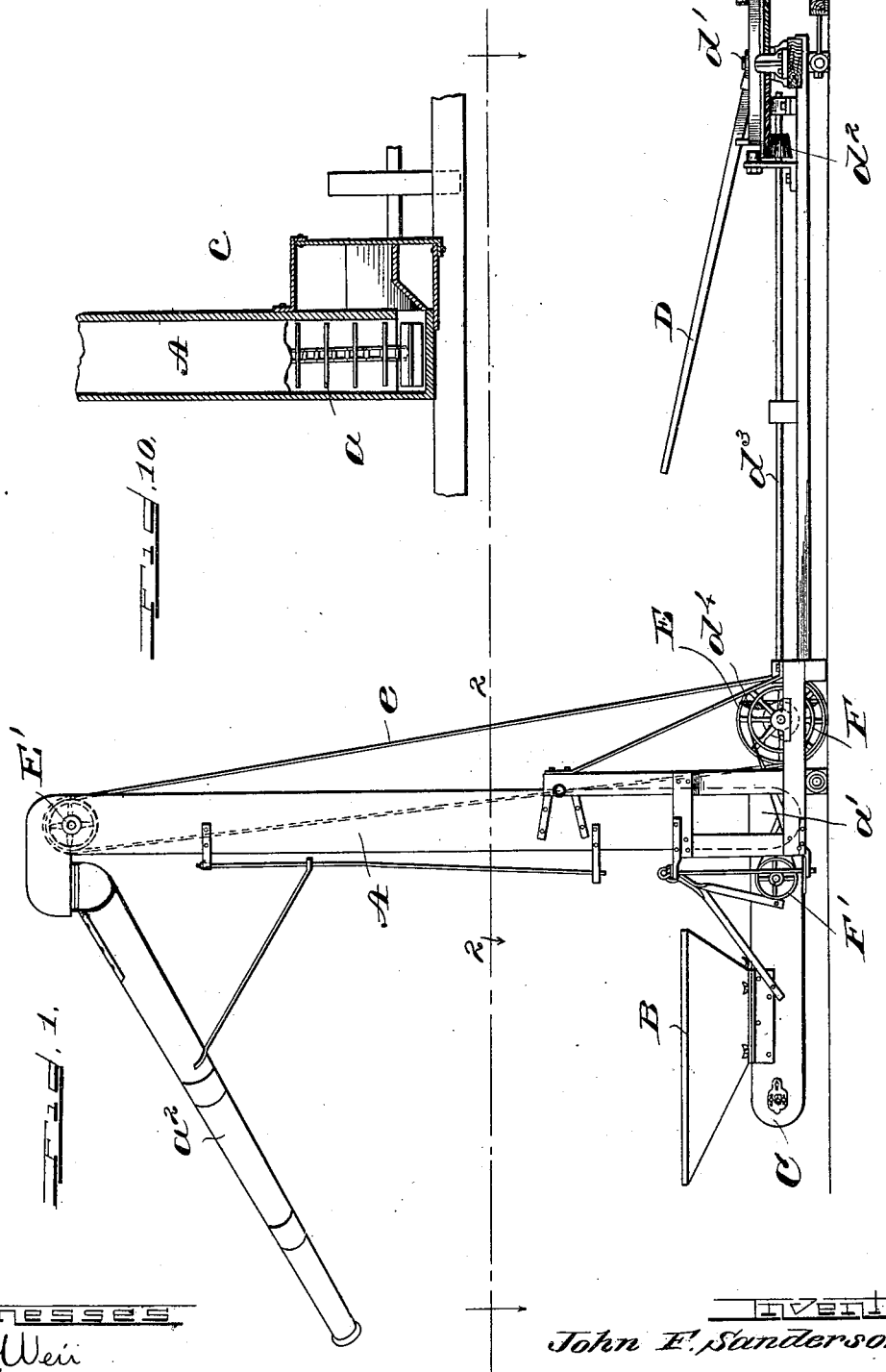

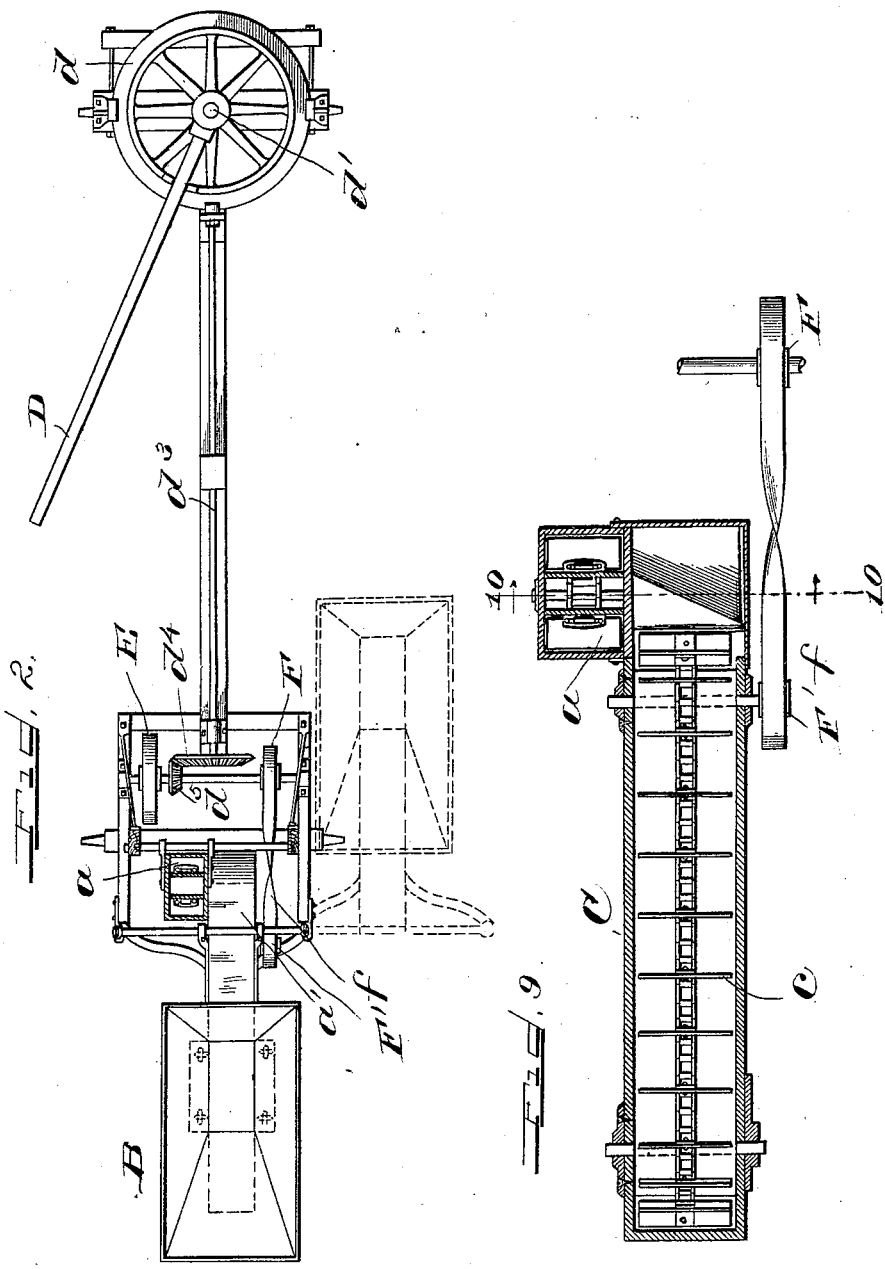

No. 674,473. Patented May 21, 1901.
J. F. SANDERSON.
ELEVATOR.
(Application filed June 9, 1900.)
(No Model.) 5 Sheets—Sheet 3.
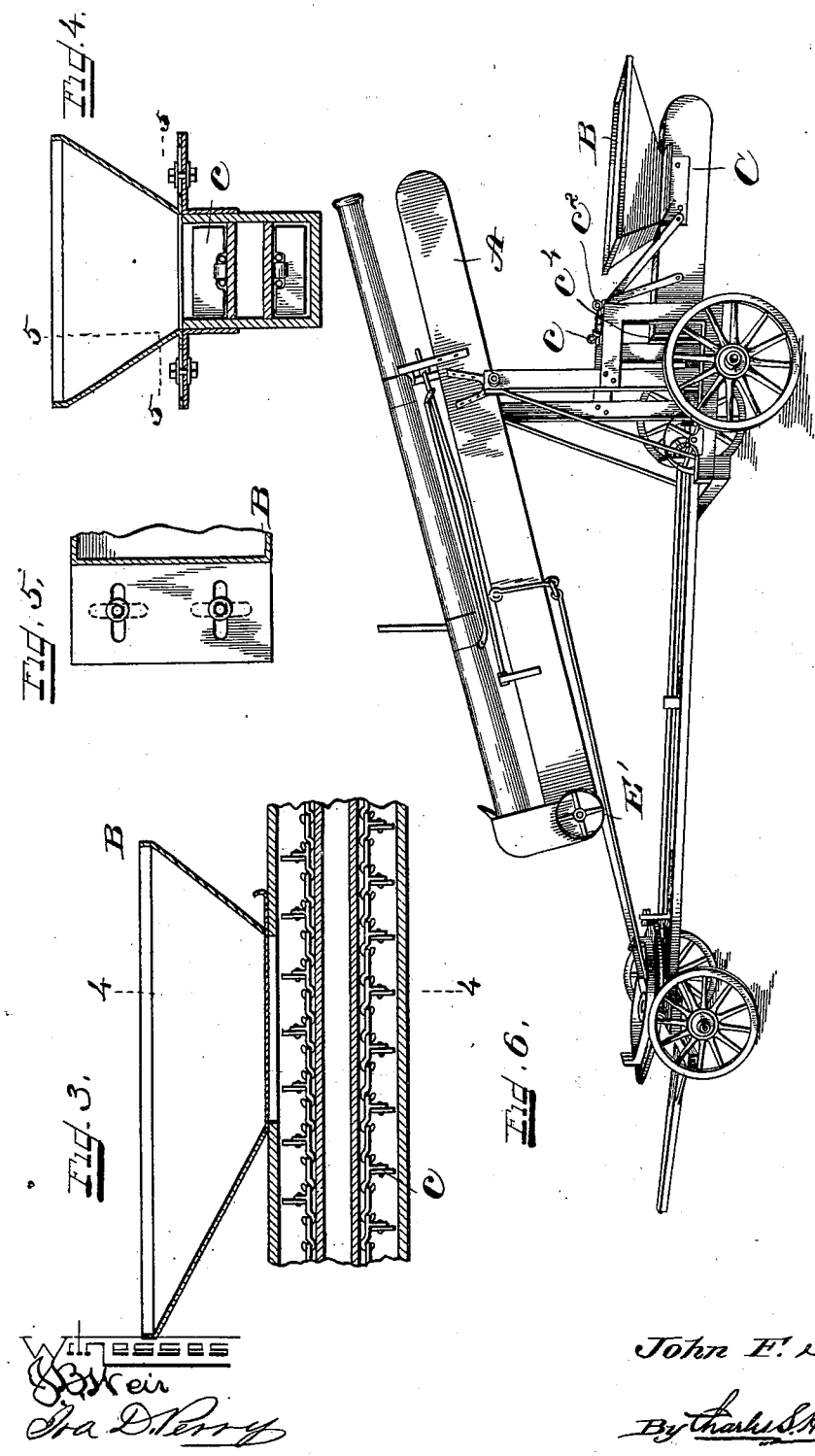

No. 674,473. Patented May 21, 1901.
J. F. SANDERSON.
ELEVATOR.
(Application filed June 9, 1900.)
(No Model.) 5 Sheets—Sheet 4.
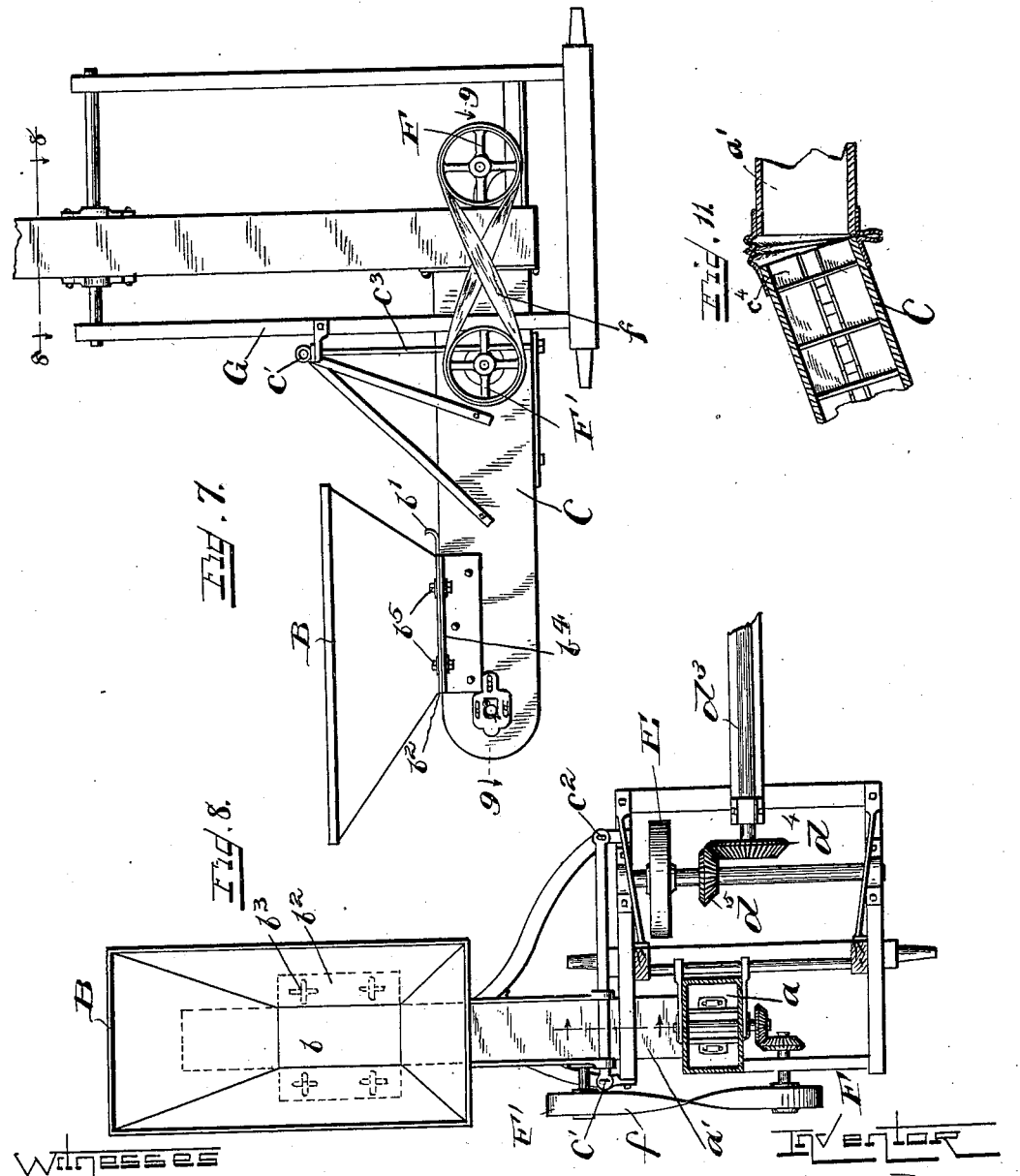
Witnesses
JB Weir
Ira D. Perry
Inventor
John F. Sanderson
By Charles S. Hill his Atty No. 674,473. Patented May 21, 1901.
J. F. SANDERSON.
ELEVATOR.
(Application filed June 9, 1900.)
(No Model.) 5 Sheets—Sheet 5.
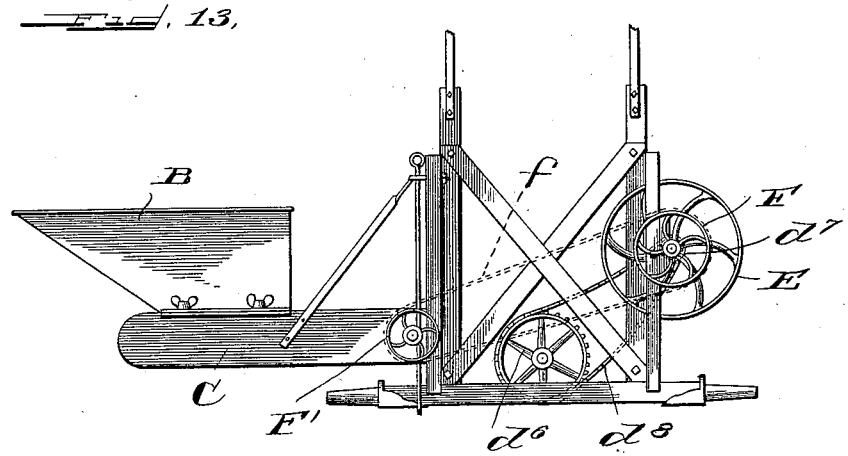
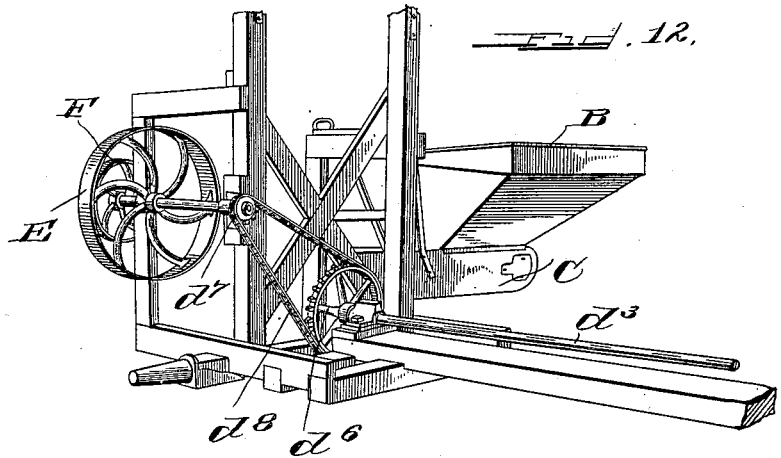
Witnesses
Inventor
John F. Sanderson
By Charles S. Hill his Atty

UNITED STATES PATENT OFFICE.

JOHN F. SANDERSON, OF MINNEAPOLIS, MINNESOTA.

ELEVATOR.

SPECIFICATION forming part of Letters Patent No. 674,473, dated May 21, 1901.

Application filed June 9, 1900. Serial No. 19,771. (No model.)

*To all whom it may concern:*

Be it known that I, JOHN F. SANDERSON, a citizen of the United States, residing at Minneapolis, county of Hennepin, and State of Minnesota, have invented certain new and useful Improvements in Elevators, of which the following is a specification.

My invention relates to elevators for the expeditious and economical handling of grain, seeds, and ground substances, as well as for other materials in bulk; and it more particularly relates to portable elevators embodying a series of flights or an equivalent thereof for transferring grain from wagons into bins, grain-cars, or other receptacles, or vice versa; and to that end it consists in the features of construction and combination hereinafter to be more fully described, and pointed out in the claims hereto annexed.

Referring to the accompanying drawings, wherein like reference-letters indicate the same or corresponding parts, Figure 1 is a side elevation of one form of my device. Fig. 2 is a plan view of the form of my apparatus shown in Fig. 1, a small portion being shown in section. Fig. 3 is a sectional view of a portion of the parts shown in Figs. 1 and 2. Fig. 4 is a vertical section taken on the line 4 4 of Fig. 3. Fig. 5 is a plan view, a portion thereof being shown in section, taken on the line 5 5 of Fig. 4. Fig. 6 is a perspective view of the form of my device shown in Fig. 1 when folded for transportation. Fig. 7 is a side elevation of a modified form of a portion of the parts shown in Figs. 1 and 2. Fig. 8 is a plan view of the parts shown in Fig. 7, a small portion thereof, on line 8 8, being shown in section. Fig. 9 is a sectional view of a portion of the parts shown in Fig. 7, taken on the line 9 9 thereof and viewed in the direction indicated by the arrows at the sides of said figure. Fig. 10 is a sectional view on line 10 10 of Fig. 9 viewed in the direction indicated by the arrows at the top and bottom of said figure.
Fig. 11 illustrates one manner in which the end $c^4$ of the conveyer-casing C may be connected to the opening of the elevator-boot, so as to form a continuous passage from the hopper to said boot, as will be hereinafter more fully described. Fig. 12 is a perspective view illustrating a modified form of a portion of the parts shown in Fig. 1 and illustrates that form of driving mechanism I prefer to employ in connection with my device. Fig. 13 is an end view of the parts shown in Fig. 12.

I am well aware that portable elevators are well known in the art and that the elevating mechanism of said devices has been operated by various power means. It will therefore be understood that my invention is not limited to the particular character of power and power-transmitting means hereinafter described in connection with my device, nor do I limit my invention to portable elevators, inasmuch as the portability of the device does not form an essential feature thereof, but is rather a mere means for conveniently moving the device from place to place as desired. It will also be understood that the movability of the device may be accomplished by horse, electric, or steam propelling power, as desired, and that said transporting means may be so connected to the device as to operate the conveying or elevating mechanism when the conveyer is stationary and in position for use, or said operating power means may be separate and distinct from the transporting power means.

Referring to the drawings, A is a casing or jacket containing suitable elevating mechanism connected to the operating power means and indicated in the form shown in the drawings by the letter $a$. B is an adjustable hopper, hereinafter to be more fully described. C is a casing or jacket within which and properly connected to the operating power means is a suitable conveying device. Both the elevating and conveying means referred to may consist of any of the well-known devices, such as an endless screw or an endless chain or belt provided with buckets or flights of any suitable form, said conveying means in the form shown in the drawings being indicated by the letter $c$. The operation of this portion of my device is as follows: Assuming the conveying and elevating devices to be in operation, if grain be cast into the hopper B it will pass through the aperture $b$ at the base thereof into the conveyer-jacket C, whence the conveying mechanism $c$ will communicate it to the elevator-boot $a'$, where it will come into contact with the elevating mechanism $a$ and be finally discharged from the spout $a^2$.

Referring to the particular power means illustrated in Figs. 1 and 2, D is a horse-power sweep connected to the master gear-wheel $d$, which gear-wheel is pivoted at the point $d'$. $d^2$ is a bevel-gear the teeth of which intermesh with the teeth of the gear-wheel $d$. $d^3$ is a main shaft connected to the bevel-gear $d^2$ and also connected to the bevel-gear $d^4$, which intermeshes with the bevel-gear $d^5$. E F are pulleys respectively operating the belts $e\ f$, which in turn respectively control the operation of the pulleys E' F' and the conveying and elevating mechanism connected therewith.

Having described the general relation of the parts of the device one to another, I will now more fully describe the parts to which my invention particularly relates, their functions, and operation.

Again referring to the drawings, the hopper B is, as stated, provided with an aperture at its base $b$, which opening is controlled by the slide or shutter $b'$, and it is further provided with a flange $b^2$, having elongated bolt-holes $b^3$. (Shown in dotted lines, Figs. 5 and 8.) The flange $b^2$ rests upon a flange or shelf $b^4$, attached to the casing C, said two flanges being secured together by means of the bolts $b^5$, which pass through the apertures $b^3$, which are of such shape as to admit of the hopper being laterally or longitudinally adjusted in order to bring it in proper relation with the source of supply, as a wagon-body, grain-car, &c. The casing C is hinged to the framework G at the points $c'\ c^2$ by means of the removable pivot-rods $c^3$ and, together with the hopper mounted thereon and its contained conveying mechanism, may be swung to one side or another, as desired, by removing one of the pivot-rods $c^3$ and (when necessary) the belt $f$, thereby permitting said parts to be swung upon the other of said pivot-rods. It is necessary to so move the parts referred to before the elevating mechanism can be folded in the manner illustrated in Fig. 6, after which the hopper and other adjustable parts may be returned to their normal position, as also shown in Fig. 6. It will be observed that the open end $c^4$ (shown in Fig. 6) of the conveyer-casing C when the parts of the device are in their normal operative position, as shown in Figs. 1, 2, 7, 8, and 9, communicates with a similar opening in the elevator-boot and when the hood or flexible or foldable portion of the feed-passages is employed that a continuous passage exists from the hopper to the elevator-boot, even if the pivotally-adjustable portions are not in their exact normal position. (See Fig. 11.)

The lateral and longitudinal adjustability of the hopper and the pivotal adjustability of the casing C, the hopper mounted thereon, and the conveying mechanism contained within the casing, which constitutes a forced feed to the elevating mechanism, form in themselves separate and essential features of my invention, as do they also in combination with the power-transmitting and the elevating mechanisms.

Elevators as now known to the art are chiefly defective because the hopper is not adjustable with relation to the source of supply. It is difficult and ofttimes impossible to properly direct into the mouth of the hopper the commodity to be elevated. Especially is this the case when the source of supply is one which in order to unload its contained commodity into the hopper it is necessary to back toward the same or to scoop it therefrom and throw it into the mouth of the hopper—an operation that occasions a great loss of time as well as of material.

Figs. 7 and 8 show a modified form of my device in which the normal position of the pivotally-adjustable parts hereinbefore referred to is at the side instead of at the end of the device, as shown in Figs. 1, 2, and 6.

Figs. 9 and 10 illustrate one of the many well-known forms in which the interior of the elevator-boot may be constructed in order to direct materials received therein to the elevating mechanism.

Figs. 12 and 13 illustrate, as stated, the power-transmitting means I prefer to employ in connection with the other parts of my device. Referring to said figures, $d^3$ is a main driving-shaft, which in revolving causes the chain-wheel $d^6$ to turn, thereby turning the chain-wheel $d^7$, which is connected to it by means of the chain belt $d^8$. When the chain-wheel $d^7$ is caused to revolve, it turns the pulleys E F, which in turn operate their respective belts $e\ f$ and the conveying mechanism controlled thereby. When this form of power-transmitting mechanism is employed, the hopper B and the feed-box C are when in position for operation at the side of the device, in the same manner as shown in Figs. 7 and 8.

It is obvious that the elongated bolt-holes $b^3$ may be in either or both of the flange-plates $b^2\ b^4$ and that they may be of any suitable number, size, and form; that the delivering member $a^2$ may be an open trough or a closed tube or passage and that, if preferred, it may be flexible or telescopic in its action, in which latter form it is shown in the drawings; that the pivotally-adjustable parts may be pivoted or hinged to the device in any suitable manner and at any suitable point; that the hopper B may be of any preferred form and size and that when employed with the pivotally-adjustable feed it may or may not be independently adjustable; that the device as a whole may, if desired, be mounted on wheeled axles and that said axles may be straight, dropped, or hinged, as preferred, and that instead of the arrangement of the power-transmitting parts shown in the drawings any suitable power-transmitting device or devices which will accomplish the desired result may be substituted therefor. Again, it is obvious that a flexible or foldable hood or continuation of the feed-casing C may be employed, if desired, to connect the open end of the conveyer-passage with the opening in the elevator-boot and that the flexible or foldable continuation of the forced-feed passage may be secured either to the elevator-boot or the casing C in any suitable manner. It is also obvious that the number, size, and form of the parts of my device may be greatly varied without departing from the principle of the invention.

Having thus described my invention, what I claim as new, and desire to secure by Letters Patent, is—

1. In an elevator the combination of a vertically-arranged elevating means, a relatively practically horizontally arranged feed means in communication at one end with said vertically-arranged elevating means, and having its opposite end horizontally movable, and an independently horizontally adjustable receiving member carried by the horizontally-movable end of the said feed means, substantially as described.

2. In an elevator the combination of an elevating means, a feed means having one end in communication with the said elevating means and its opposite end horizontally movable in respect thereto, and an independently horizontally adjustable receiving member mounted upon the movable end of the said feeding means, substantially as described.

3. In an elevator, the combination of elevating means, feed means horizontally adjustable with relation to said elevating means, a hopper mounted upon the casing of said feed means, and means whereby said hopper will be independently horizontally adjustable thereupon, substantially as described.

JOHN F. SANDERSON.

Witnesses:
S. A. REED,
CLIFFORD S. LEWIN.